Patented Oct. 29, 1929

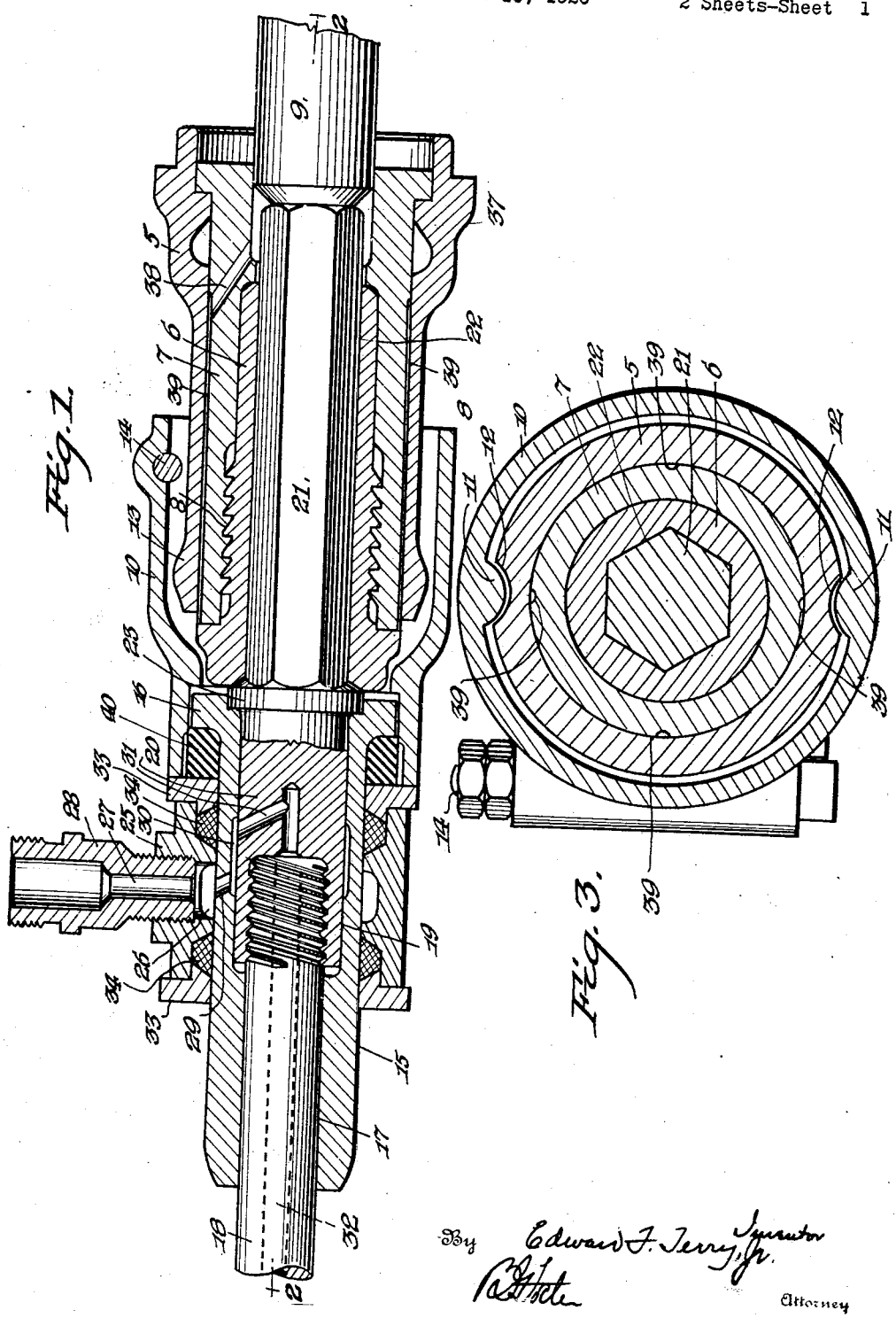

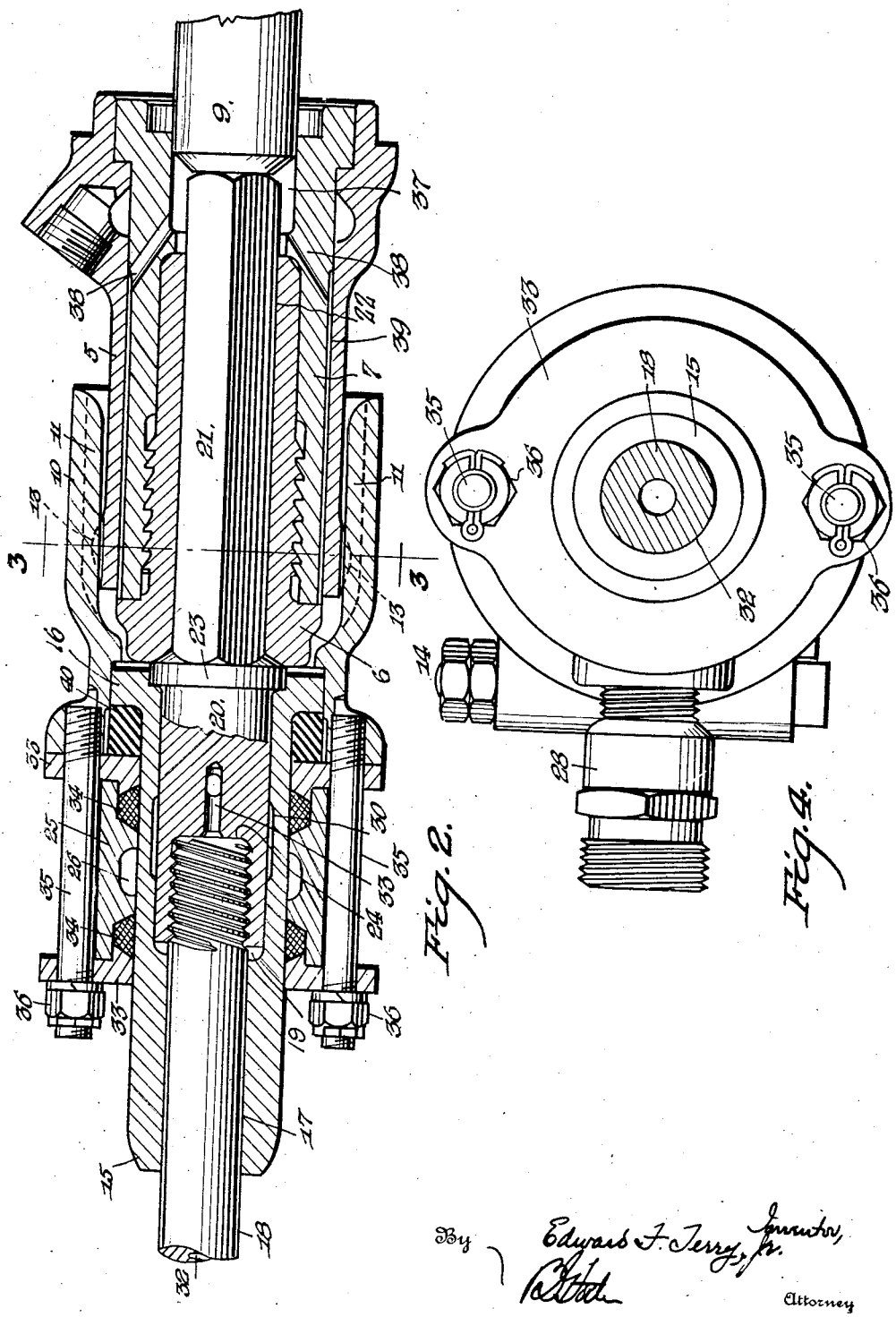

1,733,437

UNITED STATES PATENT OFFICE

EDWARD F. TERRY, JR., OF DENVER, COLORADO, ASSIGNOR, BY MESNE ASSIGNMENTS, TO THE GARDNER-DENVER COMPANY, OF QUINCY, ILLINOIS, A CORPORATION OF DELAWARE

ROCK-DRILLING APPARATUS

Application filed February 18, 1926. Serial No. 89,221.

In the drilling of certain kinds of rock, particularly in confined places such as mines, the dust from the drilling constitutes a serious menace to the health of the miners and other operators. The utilization of water to allay this dust has in part been successful, but it has been proven that the rock cuttings have not been thoroughly wet, so that a certain amount of dust escapes from the hole being drilled with what is apparently wet sludge. This seems to be due to the fact that air from the drilling machine is either allowed to flow into the bore of the drill steel or escapes from the drilling motor into the drill steel and discharges with the sludge in the form of bubbles. These bubbles contain dry dust, and enough of this dry dust escapes to endanger the health of those about the machines who perforce breathe it.

The principal object of the present invention is to provide an apparatus that has strictly a water or liquid cleansing function, and in which air is absolutely excluded from the bore of the drill steel and consequently acting as a means for carrying dust from the drill hole.

One embodiment of the invention is illustrated in the accompanying drawings, wherein:—

Figure 1 is a longitudinal sectional view through the front or chuck end of a drilling apparatus equipped with the novel mechanism, Figure 2 is a longitudinal sectional view at right angles to Fgure 1, but on the line 2—2 of said figure.

Figure 3 is a cross sectional view on the line 3—3 of Figure 2,

Figure 4 is a front elevation of the structure disclosed.

The drilling motor may be of any desired construction, and therefore only parts are shown. These parts consist of a head 5, in which is located a rotatable bushing composed of a front section 6 and a rear section 7 that are inter-threaded, as illustrated at 8. The rotation of this bushing is effected by any means well known to the art. The front end of the usual hammer piston is illustrated at 9, and is adapted to enter the rear end of the bushing section 7.

A housing shell 10 is reciprocably mounted on the cylinder head 5, and is held against rotation by being provided with inset ribs 11 slidably engaged in grooves 12 formed in opposite sides of the head 5. Said head is provided at its front end with an enlargement 13, behind which is located a transverse retaining bolt 14 fixed in the rear end of the housing, and constituting a stop for limiting the forward movement of said housing.

The housing 10 projects beyond the front end of the bushing section 6, and in said projecting end is the rear end portion of a sleeve 15. This sleeve has an outstanding annular flange 16 on its rear end within the housing. The chuck sleeve is provided in its front end with a longitudinal bore 17 that receives the rear end portion of a drill steel, a portion of which is shown at 18. The rear end portion of the chuck sleeve is counterbored, as shown at 19, and into said counterbore is tightly fitted the front end portion 20 of a chuck tappet, said tappet having a rearwardly extending angular portion 21 that fits in the corresponding angular socket or bore 22 of the rotary bushing section 6. This angular portion 21 projects rearwardly into the bushing section 7 and in a position to be struck by the hammer piston 9. At the juncture of the portions 20 and 21 of the tappet, there is formed an outstanding flange 23 that is interposed between the rear end of the sleeve 15 and the front end of the bushing section 6.

The front end of the tappet is provided with a socket 24 alined with the bore 17 and adapted to receive the rear end of the drill steel 18. It will be noted that the walls of the socket 24 are threaded, and that the rear end of the drill steel 18 is threaded, so that it will screw into said socket until its rear end face is directly abutted against the bottom or rear end wall of the socket 24. This detachably couples the drill steel and tappet together, and one of the problems has been to so connect these two elements that successive blows delivered by the hammer piston will be transmitted to the drill steel without injuring the threads, without wedging the drill steel so tightly in the tappet that it cannot be conveniently removed, and on the other hand holding the two parts together so that the vibration will not cause the drill steel to loosen or move forwardly in the socket, and thus cause the kinetic force of the hammer blows to be transmitted to the steel through the threads, to the detriment of the latter. It has been found after careful experimentation that the range of pitch of the thread for this purpose is limited and that a minimum of about six degrees to a maximum of about thirty degrees defines the limits of such range. As a matter of fact it has been determined that approximately eight and three-quarters degrees pitch is most satisfactory, because after a long period of operation the drill steel can ordinarily be turned by hand and disengaged from the socket, and consequently detached from the chuck, and yet will maintain its operative position in the tappet while being hammered.

Surrounding the sleeve 15, in advance of the housing 10, is a liquid supply collar 25, having an internal annular channel 26. Communicating with this channel is the bore 27 of an outstanding nipple 28, by which a suitable supply hose can be coupled to the collar. The channel 26 is in communication through a port 29 in the sleeve 15 with an internal annular groove 30 formed in the inside of the sleeve 15, around the front end 20 of the tappet, and said front end has a passageway 31 leading from the groove 30 to the rear end of the tappet socket 24, and thus being in communication with the bore 32 of the drill steel. The collar 25 is provided at its opposite ends with packing glands 33, and these packing glands include packing rings 34. Attention is specifically called to the formation of the rings 34, which are oppositely beveled, so that when compressed they will serve to close the joints between the ring 25 and sleeve 15, not only to prevent the escape of liquid from the channel 26, but what is of as great importance, will prevent any inflow of air to the channel 26. The collar 25 and packing gland rings 33 are secured to the housing 10 by stud bolts 35 projecting from the housing, extending through the rings 33, and having tension nuts 36 on their front ends. By turning these nuts, obviously the packing glands are compressed and the parts all held securely to the housing. In addition means are provided for venting the front end of the cylinder head in order that air escaping past the piston hammer can find a ready outlet to atmosphere, and will thus be prevented from being forced or passing into the water supply means. To this end the chamber or socket 37 into which the rear end of the tappet 21 extends and into which the front end of the hammer piston 9 moves, is provided with vent ports 38 leading outwardly to channels 39 formed in the bushing section 7, and opening into the interior of the housing 10, from which any fugitive air under pressure can escape to atmosphere.

It will be noted that not only are the drilling steel 18 and tappet 20—21 fixed together so that they will move in unison, but the sleeve 15 will also correspondingly move under the blows of the hammer piston, the three parts acting as one entity. The chuck tappet also serves as a connection between the bushing 6—7 and the sleeve 15 so that upon the rotation of the former, the latter will rotate within the water supply swivel collar 25. In order to allow for this and obtain the proper return of the parts, a yielding ring 40 is interposed between the flange 16 of the chuck sleeve and the adjacent packing gland ring 33, this ring being surrounded by the front end of the housing 10. The purpose of the sleeve 10 reciprocating on the cylinder 5 is for reducing the shock imparted to the drill. When the tappet 21 is struck by the hammer piston, the sleeve 15 moves in unison therewith against the yielding cushion 40 which permits the sleeve 15 to move within the bushing 25. At the same time there is a slight movement of the sleeve 10 on the front end of the cylinder. Should the sleeve 10 be a part of the cylinder 5 the jar imparted to the lower portion of the tool and particularly the ring 25 would be great and there would be the possibility of breaking the water connections while adding stress upon the drill. The sleeve 10 furthermore being removable gives ready access to the sleeve 15 and the tool carried thereby.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:

1. In drilling apparatus, the combination with a drilling motor having a hammer piston, of a drill steel holder including a tappet against which the hammer strikes, means for detachably securing together the tappet and a drill steel, means for supplying a cleansing liquid through the tappet to the bore of the drill steel, packing around said holder that prevents the entrance of air about said holder to the liquid supply means and drill steel, and means interposed between the hammer piston and tappet and in rear of the packing for venting to atmosphere air escaping past the front end of the hammer piston.

2. In drilling apparatus, the combination with a drilling motor having a hammer piston, of a sleeve at the front end of the motor, a tappet in the sleeve and against which the hammer strikes, means for detachably securing together the tappet and a drill steel, means for supplying a cleansing liquid through the sleeve and tappet to the bore of the drill steel and including a channeled collar surrounding the chuck sleeve, packing between the collar and sleeve that prevents the escape of the liquid from the collar rearwardly along the sleeve and prevents the inflow of air along the tappet into the channel of the collar, and means interposed between the hammer piston and tappet for venting to atmosphere air escaping past the front end of the hammer piston and in rear of the packing.

3. In drilling apparatus, the combination with a drilling motor having a hammer piston, of a sleeve at the front end of the motor, a tappet in the rear portion of the sleeve and terminating short of the front end thereof, said front end having a drill steel receiving bore and said tappet having a steel-receiving socket in line with the bore and having means in the socket for detachably interlocking with the drill steel, said tappet having its rear end in position to be struck by the hammer piston, means for supplying a cleansing liquid through the sleeve and tappet to the bore of a drill steel interlocked with the tappet, and including a channeled collar surrounding the sleeve, packing between the collar and sleeve that prevents the escape of the liquid from the collar around the tappet and prevents the inflow of air along the tappet into the channel of the collar, and means interposed between the hammer piston and tappet behind the packing for venting to atmosphere air escaping past the front end of the hammer piston.

4. In a drilling apparatus, the combination with a motor including a cylinder head and a hammer piston, of a housing reciprocably mounted on the cylinder head, a sleeve movably mounted in the housing and having a lateral liquid port, a tappet in the sleeve movable therewith and having a steel receiving socket in its front end and a lateral liquid passageway leading from the sleeve port to the rear end of the socket, and a liquid supply collar surrounding the sleeve in advance of the housing and having a liquid supply channel in communication with the sleeve port.

5. In a drilling apparatus, the combination with a motor including a cylinder head, and a hammer piston, of a housing reciprocably mounted on the cylinder head, a sleeve reciprocably mounted in the housing and having a lateral liquid port, a tappet in the sleeve reciprocable therewith and having a steel receiving socket in its front end and a lateral liquid passageway leading from the sleeve port to the rear end of the socket, and a liquid supply collar surrounding the sleeve in advance of the housing and having an internal annular liquid supply channel over the sleeve port.

6. In a drilling apparatus, the combination with a motor including a cylinder head, and a hammer piston, of a housing mounted on the cylinder head and projecting beyond the same, a sleeve reciprocably mounted in the housing, a tappet mounted in the sleeve and reciprocable therewith, said tappet receiving blows from the hammer piston and having a socket at its front end for the reception of the drill steel, and yielding means that resists the forward movement of the sleeve.

7. In a drilling apparatus, the combination with a motor including a cylinder head, and a hammer piston, of a housing mounted on the cylinder head and projecting beyond the same, a sleeve reciprocably mounted in the housing, a tappet mounted in the sleeve and reciprocable therewith, said tappet receiving blows from the hammer piston and having a socket at its front end for the reception of the drill steel, yielding means interposed between the portions of the housing and sleeve that resists the forward movement of the sleeve, a liquid supply collar surrounding the sleeve, and a liquid passageway leading from the collar to the drill steel receiving socket of the tappet.

8. In a drilling apparatus, the combination with a drilling motor including a cylinder head and a hammer piston, of a housing reciprocably mounted on the cylinder head and projecting beyond the same, a liquid supply collar secured to the front end of the housing and reciprocable therewith, a sleeve reciprocably mounted within the housing and extending through the collar, a tappet within the sleeve having means for securing the rear end of a drill steel thereto and being in position to receive blows from the hammer piston, and means for conducting liquid from the collar to the rear end of the steel reciving socket.

9. In a drilling apparatus, the combination with a drilling motor including a cylinder head and a hammer piston, of a housing reciprocably mounted on the cylinder head and projecting beyond the same, a sleeve having its rear end reciprocably fitted into the housing and projecting beyond the same, a liquid supply collar surrounding the sleeve in advance of the housing and reciprocable therewith, bolts connected the collar and housing, a tappet within the sleeve having means for securing the rear end of a drill steel thereto and being in position to receive blows from the hammer piston, and means for conducting liquid from the collar to the rear end of the steel receiving socket.

10. In a drilling apparatus, the combination with a drilling motor including a cylinder head and a hammer piston, of a housing reciprocably mounted on the cylinder head and projecting beyond the same, a sleeve having its rear end fitted into the housing and projecting beyond the same, a liquid supply collar surrounding the sleeve in advance of the housing, bolts connecting the collar and housing, a tappet within the sleeve terminating short of its front end and projecting beyond its rear end into the cylinder head and in a position to be struck by the hammer piston, the front end of said sleeve having a bore to receive the drill steel and the front end of the tappet having a drill steel receiving socket provided with means for interlocking with the steel, and a passageway for conducting liquid from the liquid supply collar to the rear end of the tappet socket.

11. In a drilling apparatus, the combination with a drilling motor including a cylinder head and a hammer piston, of a housing reciprocably mounted on the head and projecting beyond the same, an internally channeled liquid supply collar in advance of the housing and having opposite packing glands, tie bolts connecting the collar and glands to the housing, a chuck sleeve engaged in the front end of the housing and extending through the collar, said sleeve having a front bore for the reception of the drill steel and having a counterbore in its rear end, a tappet having its front end in the counterbore and its rear end projecting into the cylinder head in position to be struck by the hammer piston, said tappet having its front end provided with an internally threaded socket in line with the sleeve bore for the reception of the threaded rear end of the drill steel, and a passageway leading from the channel of the collar to the socket.

12. In drilling apparatus, the combination with a rotatable sleeve, of a drill steel engaging member therein rotatable with the sleeve, a valve swivel ring surrounding the sleeve and in which the sleeve is rotable, said ring and member having a passageway from the ring to the drill steel, means for packing the swivel to prevent air passing along the member into the water swivel ring, and means for permitting the air escaping from the motor to vent to atmosphere behind the swivel ring.

13. In drilling apparatus, the combination with a motor head, of a rotatable bushing therein, a rotatable sleeve in advance of the bushing, a tappet member slidable in the bushing and in the sleeve and constituting a connection between them, said tappet member having means for the attachment thereto of the drill steel, and means surrounding the sleeve and having communication with the drill steel for conveying liquid to the latter while excluding air therefrom.

14. In drilling apparatus, the combination with a drilling motor having a hammer piston, of a drill steel holder including a tappet against which the hammer strikes, means for detachably securing together the tappet and a drill steel, means for supplying a cleansing liquid only through the tappet to the bore of the drill steel, packing around said holder on opposite sides of the liquid supply, means for forcing said packing against the holder to prevent the ingress of air along the holder into the liquid supply, and means between the motor and the packing for venting to atmosphere air escaping past the front end of the piston hammer.

15. In drilling apparatus, the combination with a drilling motor having a hammer piston, of a drill steel holder including a tappet against which the hammer strikes, means for detachably securing together the tappet and a drill steel, means for supplying a cleansing liquid only through the tappet to the bore of the drill steel, outwardly beveled packing rings around said holder on opposite sides of the liquid supply, means for forcing said packing rings against the holder to prevent the ingress of air along the holder into the liquid supply, and a chamber at the point of juncture of the tappet and piston for receiving air escaping past the front end of the piston hammer, said chamber having vent ports to atmosphere.

In testimony whereof, I affix my signature.

EDWARD F. TERRY, Jr.